Figure 1:
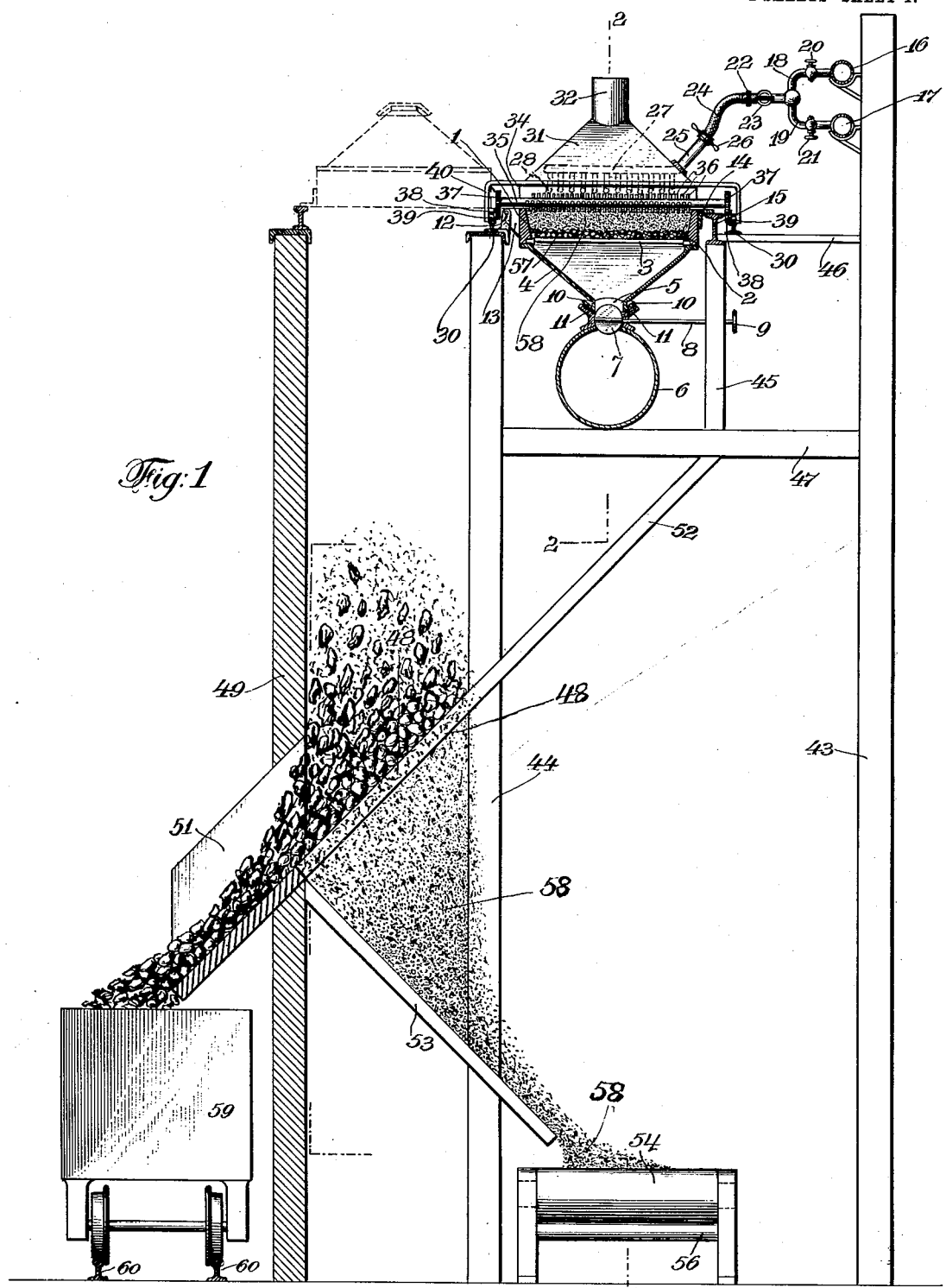

W. G. PERKINS & M. L. REQUA.
PROCESS OF AND APPARATUS FOR TREATING ORES.
APPLICATION FILED AUG. 18, 1908.

951,198.

Patented Mar. 8, 1910.

2 SHEETS—SHEET 1.

W. G. PERKINS & M. L. REQUA.
PROCESS OF AND APPARATUS FOR TREATING ORES.
APPLICATION FILED AUG. 18, 1908.
951,198.
Patented Mar. 8, 1910.
2 SHEETS—SHEET 2.
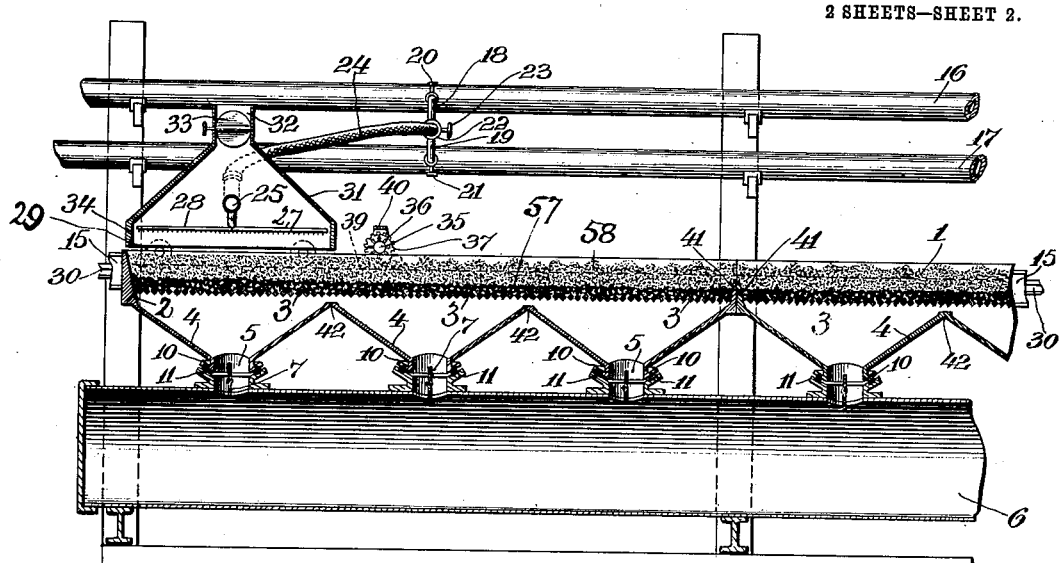
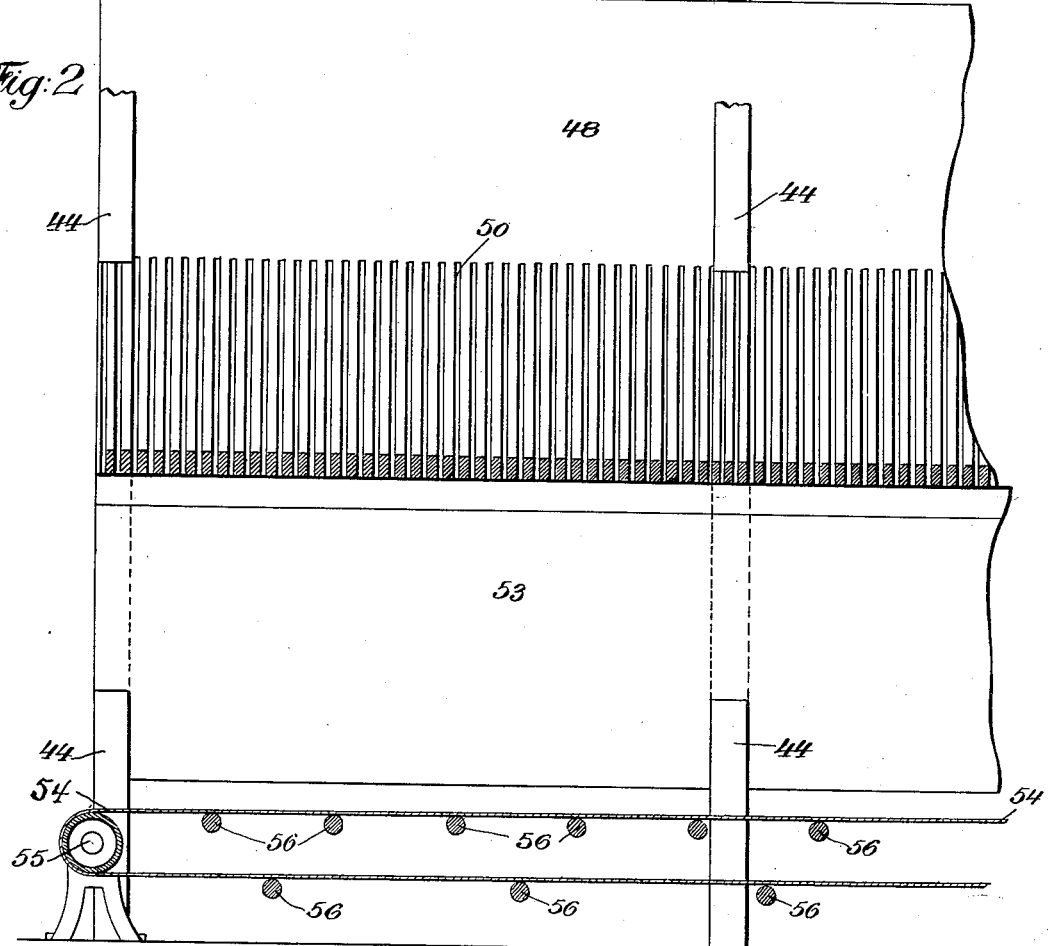
Fig. 2
Witnesses:
W. A. Hutton
John O. Gundell
Inventors
Walter G. Perkins
Mark Lawrence Requa
By their Attorneys
Kenyon & Kenyon

UNITED STATES PATENT OFFICE.

WALTER G. PERKINS, OF SMELTER, NEVADA, AND MARK LAWRENCE REQUA, OF SAN FRANCISCO, CALIFORNIA, ASSIGNORS TO PERKINS SINTERING COMPANY, OF SAN FRANCISCO, CALIFORNIA, A CORPORATION OF CALIFORNIA.

PROCESS OF AND APPARATUS FOR TREATING ORES.

951,198.  Specification of Letters Patent.  Patented Mar. 8, 1910.

Application filed August 18, 1908. Serial No. 449,046.

*To all whom it may concern:*

Be it known that we, WALTER G. PERKINS, a subject of the King of Great Britain, residing at Smelter, White Pine county, Nevada, and MARK LAWRENCE REQUA, a citizen of the United States, residing at San Francisco, California, have invented certain new and useful Improvements in Processes of and Apparatus for Treating Ores, of which the following is a specification.

Our invention relates to the treatment of metalliferous ores preparatory to the smelting process, whereby waste of the valuable elements of the ore is avoided or reduced to a minimum, and the ore put into suitable condition for smelting in a blast furnace. The best known means of accomplishing this important result, is to agglomerate or sinter the ore, which is usually in a finely divided state, by subjecting the same to the action of heat from either solid or gaseous burning products, whereby the metalliferous elements will become agglomerated, or sintered into a solid mass or good sized pieces or lumps, which are then in condition for further treatment, such as smelting as in a blast furnace, without the risk of waste or loss of the valuable elements of the ore.

The principal object of our invention is to save all the valuable elements of the ore and to put it in proper condition for smelting and further treatment.

Our invention consists of the method hereinafter described and claimed.

The accompanying drawings illustrate an apparatus embodying our invention in which—

Figure 1 is a vertical section from front to rear of said apparatus. Fig. 2 is a similar section of the apparatus as made through lines 2—2 of Fig. 1.

1 is a holder or receptacle for receiving the ore, and in which said ore is to be agglomerated or sintered. The inner walls 2 of said receptacle preferably incline inward as shown. The bottom or bed of the receptacle 1 is pervious to an aeriform agent or perforated, and as shown in the drawing, which is a preferred form, said bottom is formed of parallel grate bars 3, which should be placed quite close together (preferably from one-eighth to one-quarter of an inch), but permitting the passage of air, gas, or similar agents. Extending below the grate bars 3 is a funnel-shaped device 4, the upper ends of the walls of said device being connected with the lower ends of the walls of the receptacle 1. The lower small end of the funnel 4 opens into a passageway 5, leading into a tube 6, which leads to an exhaust apparatus, (not shown). Within the passageway 5 is a damper 7, preferably of butterfly form, said damper being provided with an ordinary rod 8, and a handle 9 for operating the damper. The lower small end of the funnel 4 is not secured to the tube 6, and it is provided with a downwardly extending nozzle, having an oblique upwardly extending flange 10. The passageway 5 is formed within said nozzle and an upward extension of the tube 6, said extension being provided with upwardly and outwardly extending flanges 11, contacting with the flanges 10 of the nozzle.

The above construction is to permit the receptacle 1 and the funnel 4 of being lifted from operative relation with the tube 6. One of the walls of the receptacle 1 is hinged, as at 12, to a support 13, and the opposite wall of said receptacle is provided with an outwardly extending lug 14, which rests upon a support 15 when the funnel 4 and the receptacle 1 are in operative relation with the tube 6, as shown in Fig. 1. From the above it will be seen that receptacle 1 and its funnel 4 may either be in close connection with the tube 6 with the flange 10 of the funnel resting on the flange 11 of the extension of tube 6, or said receptacle with its funnel may be swung out of such relation and over the support 13, so that any material that may be resting upon the bottom or grate bars 3 may be dumped from said receptacle (as shown in dotted lines in Fig. 1).

16 and 17 are gas and air tubes respectively. These tubes are provided with lateral extensions, 18 and 19 respectively, the passages of which are controlled by cocks 20 and 21, and said tubes 18 and 19 unite in a tube 22, the passage of which is also controlled by cock 23.

24 is a flexible hose removably connected to the tube 25 by the union 26, and this tube 25 is connected to a series of horizontal pipes 27 provided with a number of downwardly extending nozzles 28. The pipes 27 are supported upon rollers 29 in any appropriate manner, said rollers resting upon horizontal rails 30, parallel to the top of the receptacle 1, with the pipes 27 extending over the top of said receptacle. Inclosing said pipes 27 is a funnel shaped hood or deflector 31, the walls of said deflector converging toward the top, where they terminate in an upwardly projecting outlet or chimney 32, the passage from said chimney being controlled by a damper 33. The tube 25 passes through and is secured to the hood 31, and the rollers 29 are journaled to the vertical walls 34 of said hood below the pipes 27.

Extending across the top of the receptacle 1 is a rod 35, provided with a number of outwardly extending pins 36, and to the ends of this rod are secured gears 37, engaging with pinions 38, which are concentrically secured to rollers 39, journaled in the supporting frame 40. As shown in Fig. 2, the above described device is situated in front of the hood 31. The transverse movement of the rod 35 with its rollers 39 moving along the rails 30, will, through the gears 38 and 37, cause the rod 35 and its pins 36 to revolve, and is for the purpose of distributing and leveling the ore that may be supported by the grate bars 3, if said ore extends as high as said pins.

In Fig. 2 of the drawings, we have shown three funnels for one receptacle 1, and where two of said receptacles unite, we have shown the adjacent walls 41 extending not quite to the top of the rails 30. This is so that a number of receptacles 1 may be connected together continuously, and so that the rollers 39 and 29 may ride over the rails across the tops of the receptacles 1 and from one to another without obstruction. The adjacent walls of the funnels 4 of each receptacle 1 are made integral with each other, as shown in Fig. 2, said adjacent walls meeting at 42. When a receptacle 1 is swung back on its pivot or hinge, all the funnels 4 of said receptacle will swing with it, and all the material that is on the grate bars 3 of said receptacle will be dumped from the same.

43 and 44 are uprights of a supporting frame which supports the apparatus above described. The tubes 16 and 17 are supported on the upright 43. The support 15 for the lug 14 is in the form of a T-rail, which rests upon an upright 45, and a rail 30 adjacent to the T-rail 15 is supported on a horizontal brace 46, secured at one end to the upright 43 and with its other end resting on the upright 45, the lower end of said upright being supported by a horizontal portion 47 of the frame work and extending between the uprights 43 and 44.

48 is an inclined plane extending downwardly from the upright 44 and in an outward direction from the same, and supported by said upright 44 and also by an upright 49 beyond the upright 44. Said inclined plane is longitudinally slotted between the uprights 44 and 49, the slots 50 being of a sufficient width to permit finely crushed stone and the unsintered ore to pass through, but not wide enough for the passage of the lumps of sintered ore. Extending upward from the opposite sides or edges of the outer end of the inclined plane 48, are vertical walls 51, the outer portion of the inclined plane and said vertical walls forming a chute for delivering any material from the inclined plane 48 that has not passed through the slots 50. In order to insure strength to the inclined plane 48, it is continued inward as at 52, to the horizontal brace 47.

53 is an inclined plane under the slotted portion of the inclined plane 48, leading to a conveyer or endless belt 54, for receiving the unsintered portions that have fallen through to the inclined plane 53, and that have fallen from said plane. This conveyer 54 may convey the unsintered ore to any point desired, so that it may be re-introduced into the same or other receptacles 1, and go through the sintering process again. We have shown only one portion of said conveyer or belt, and one of the pulleys 55 around which said belt passes, and a series of lazy rollers 56 on which the belt rests, so as to prevent too much sagging of the same.

In carrying out our improved process, a layer of stone 57, preferably crushed lime stone, is first placed upon the grate bars 3 of the receptacle 1, and then the ore or concentrates 58 are placed on said layer of stone. The leveler and distributer 36, 37 is then drawn across the layer of concentrates by means of the rollers 39 riding on the rails 30, the pins 37 raking the concentrates and distributing and leveling them over the surface of the stone 57.

The exhaust apparatus (not shown) is connected to the tube 6, the damper 7 having been previously opened, and the air or other supporter of combustion is drawn downwardly through and between the grate bars through funnels 4 and tube 6, the gas and air being permitted to pass through to the independent and joint tubes, the pipes 27 and nozzles 28, the gas is ignited at said nozzles, and the hood 31 carrying said pipes and nozzles is drawn over the surface of the ore or concentrates. If there be any appreciable combustible element in the ore or concentrates, such element or elements will then become ignited, and the gas igniter may be drawn beyond the ore or concentrates, and the continual passage of the air or other supporter of combustion through the same, will keep up the burning of the combustible elements after the gas igniter has passed, and until all or nearly all of the ore has become agglomerated or sintered into a solid mass or large lumps or pieces above the layer of stone. If there be no appreciable combustible element in the ore or concentrates, the flames or jets of the igniter should be kept in a position over the ore or concentrates, or so that they will be subjected to the action of the flames or jets until the ore has become agglomerated or sintered.

The damper 33 can be used for retaining the heat and products of combustion within and below the hood 31, or permitting the outflow, or regulating the outflow, of as much heat as is desired. The dampers 7 can also regulate the passage of the air or supporter of combustion, and after as much combustion as is desired has taken place above any of the funnels 4, the damper 7 connected with said funnel 4 may be closed, so as to shut off the passage of the supporter of combustion in said passage or funnel. When the ore in a receptacle 1 has become practically sintered, said receptacle is swung over on its hinge 12, as shown in dotted lines of Fig. 1, and the stone and ore from said receptacle is dumped upon the slotted inclined plane 48. The agglomerated or sintered ore and stone will then slide down said inclined plane and chute 48—51, where they can be removed and separated. Under the chute 48—51 we have shown a car 59, said car resting on rails 60, so that the stones and sintered ore may be removed for smelting or other further treatment. The sintered or agglomerated product that has passed through the chute 48—51 will be in proper condition for smelting in a blast furnace, or for further treatment. Some portions of the ore may be small enough to pass through slots 50 of the inclined plane 48, and this ore will be unsintered or only partially sintered. It will fall upon the inclined plane 53 and from there to the conveyer 54, and be carried to any desired point so that it may be again subjected to the above operation, or other treatment.

The subjection of the entire body of the ore to the action of air or other supporter of combustion, and the temporary subjection of the ore to burning products, and the continuation of the action of the supporter of combustion on the ore will produce the best and most complete results so far known for agglomerating or sintering the ore and putting it into proper condition for smelting in a blast furnace and for further treatment. Also the passing of burning products, particularly gas, over the surface of the ore, provides a very simple and practical means for supplying the necessary heat for the sintering process. Any device that burns products of combustion, or any gas torch or igniter may be used for passing over the surface of the ore. Also any means may be used for distributing the ore and leveling it in the receptacle in which it is and is to be treated.

We do not limit ourselves to the precise apparatus or method above described, as many changes may be made therein, or other forms of apparatus employed for carrying out our invention.

What we claim as new and desire to secure by Letters Patent, is:

1. The method of agglomerating or sintering metalliferous ores, consisting in causing a supporter of combustion to pass continuously through a body of the ore, and during said passage of said supporter of combustion passing burning products across the surface of said body.

2. The method of agglomerating or sintering metalliferous ores, consisting in causing a supporter of combustion to pass continuously through a body of the ore, and during said passage of said supporter of combustion passing burning gas across the surface of said body.

3. The method of agglomerating or sintering metalliferous ores, consisting in drawing a supporter continuously through a body of the ore, and during such action passing burning products of combustion across the surface of said body.

4. The method of agglomerating or sintering metalliferous ores, consisting in drawing a supporter of combustion continuously through a body of the ore, and during such action passing burning gas across the surface of said body.

5. The method of agglomerating or sintering metalliferous ores, consisting in causing a supporter of combustion to pass continuously through a body of the ore, and during said passage of said supporter of combustion passing burning products over and beyond the surface of said body.

6. The method of agglomerating or sintering metalliferous ores, consisting in causing a supporter of combustion to pass continuously through a body of the ore, and during said passage of said supporter of combustion passing burning gas over and beyond the surface of said body.

7. The method of agglomerating or sintering metalliferous ores, consisting in drawing a supporter of combustion continuously through a body of the ore, and during such action passing burning products over and beyond the surface of said body.

8. The method of agglomerating or sintering metalliferous ores, consisting in drawing a supporter of combustion continuously through a body of the ore, and during such action passing burning gas over and beyond the surface of said body.

9. The method of agglomerating or sintering metalliferous ores, consisting in causing a supporter of combustion to pass continuously through a stationary body of the ore, and during said passage of said supporter of combustion applying burning products to and removing them from the combustible elements in said body.

10. The method of agglomerating or sintering metalliferous ores, consisting in causing a supporter of combustion to pass continuously through a stationary body of the ore, and during said passage of said supporter of combustion applying burning gas to and removing it from the combustible elements in said body.

11. The method of agglomerating or sintering metalliferous ores, consisting in causing a supporter of combustion to pass continuously through a stationary body of the ore, and during said passage of said supporter of combustion passing burning products over and beyond the surface of said body.

12. The method of agglomerating or sintering metalliferous ores, consisting in causing a supporter of combustion to pass continuously through a stationary body of the ore, and during said passage of said supporter of combustion passing burning gas over and beyond the surface of said body.

13. The improved method of treating metalliferous ores, consisting in causing a supporter of combustion to pass continuously through a body of the ore, and during said passage of said supporter of combustion applying burning products to and removing them from the combustible elements in said body, whereby agglomeration or sintering will take place, then separating the unagglomerated or unsintered portions.

14. The improved method of treating metalliferous ores, consisting in causing a supporter of combustion to pass continuously through a body of the ore, and during said passage of said supporter of combustion applying burning products to and removing them from the combustible elements in said body, whereby agglomeration or sintering will take place, then removing the sintered portions.

15. The improved method of treating metalliferous ores, consisting in causing a supporter of combustion to pass through a stationary body of the ore, and during said passage of said supporter of combustion, applying burning products to and removing them from the combustible elements in the ore, whereby agglomeration or sintering will take place, then separating the unagglomerated or unsintered portions.

16. The improved method of treating metalliferous ores, consisting in causing a supporter of combustion to pass continuously through a body of the ore, and during said passage of said supporter of combustion, passing burning products over and beyond the surface of said body, whereby agglomeration or sintering will take place, then separating the unagglomerated or unsintered portions.

17. The improved method of treating metalliferous ores, consisting in causing a supporter of combustion to pass through a stationary body of the ore, and during said passage of said supporter of combustion, passing burning products over and beyond the surface of said body, whereby agglomeration or sintering will take place, then separating the unagglomerated or unsintered portions.

18. The improved method of treating metalliferous ores, consisting in leveling a stationary body of the ore, causing a supporter of combustion to pass continuously through the same, and during said passage of said supporter of combustion applying burning products to and removing them from the combustible elements in said body, whereby agglomerating or sintering of the ore will take place.

19. The improved method of treating metalliferous ores, consisting in leveling a stationary body of the ore, causing a supporter of combustion to pass continuously through the same, and during said passage of said supporter of combustion passing burning products over and beyond the leveled surface of said body, whereby agglomeration or sintering will take place.

20. The improved method of treating metalliferous ores, consisting in placing upon a support pervious to a supporter of combustion, a layer of stones or similar material, then placing upon said layer a body of said ore, then causing a supporter of combustion to pass through said body of ore, and during said passage of said supporter of combustion temporarily applying burning products to the combustible elements in the ore, whereby agglomeration or sintering of the ore will take place.

21. The improved method of treating metalliferous ores containing combustible elements, consisting in placing upon a support pervious to a supporter of combustion, a layer of stones or similar material, then placing upon said layer a body of said ore, then causing a supporter of combustion to pass through said body of ore, and during said passage of said supporter of combustion passing burning products over the surface of the ore, whereby agglomeration or sintering of the ore will take place.

22. The improved method of treating metalliferous ores, consisting in placing upon a support pervious to a supporter of combustion, a layer of stones or similar material, then placing upon said layer a body of said ore, then causing a supporter of combustion to pass through said body of ore, and during said passage of said supporter of combustion passing burning gas over the surface of the ore, whereby agglomeration or sintering of the ore will take place.

In testimony whereof, we have signed our names to this specification.

WALTER G. PERKINS.
MARK LAWRENCE REQUA.

Witnesses to the signature of Walter G. Perkins:
    B. L. QUAYLE,
    CHAS. S. CHANDLER.

Witnesses to the signature of Mark Lawrence Requa:
    A. BURCH,
    J. S. WALLACE.